United States Patent Office 3,597,503
Patented Aug. 3, 1971

3,597,503
CYCLIC PHOSPHOROAMIDATES AND PROCESS
FOR MAKING SAME
Bruce N. Wilson, Niagara Falls, and Raymond R. Hindersinn, Lewiston, N.Y., assignors to Hooker Chemical Corporation, Niagara Falls, N.Y.
No Drawing. Filed Dec. 6, 1967, Ser. No. 688,371
Int. Cl. C07d 105/04; C08g 22/44
U.S. Cl. 260—937                                    13 Claims

ABSTRACT OF THE DISCLOSURE

The invention includes new cyclic phosphoroamidates, new compositions thereof, and a new process for the making of the new cyclic phosphoroamidates. A typical novel cyclic phosphoroamidate of this invention is a compound of the formula:

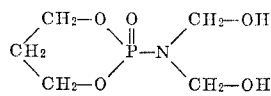

which is an effective fire retardant for various compositions such as polyurethane foam, for example. A compound of this illustrative formula may be prepared by reacting the di-functional amine precursor of the compound, with formaldehyde. The above illustrative compound also may be employed as an intermediate in the production of other compounds and/or compositions described in the specification.

---

This invention is directed to novel cyclic phosphoroamidates having novel properties, novel uses such as the production of novel polymeric compositions having unexpected utility and properties as fire retardants, and a novel process of making the cyclic phosphoroamidates.

BACKGROUND

Prior to this invention, it was known that compounds containing both phosphorus and nitrogen are sometimes characterized by fire retardant properties. However, although there has been extensive research in this field throughout the chemical industry, there has not been found to be any significant correlation, e.g., relative halide, phosphorus, and nitrogen contents of various molecules at their effectiveness as fire retardants. This is evidenced, e.g., in a recent weekly publication, "Chemical Week," Apr. 22, 1967, p. 112, which suggests such a statement was made by a representative of a leading chemical corporation.

In addition to the non-predictability of fire retardancy among the phosphorus-nitrogen compositions, there are other problems inherent in the typical fire retardants of this nature, such as hydrolytic instability, and the like.

Additionally, when a fire-retardant, hydrolytically-stable, phosphorus nitrogen compound is discovered, it is important that the compound have reactive sites whereby the compound may be reacted with various polymer compositions, as contrasted to the making of mere mixtures with such compositions in which the fire retardant characteristics of the latter may be only temporary.

In addition, the physical properties, such as each of hydrolytic and thermal stability of foams such as polyurethane foams are degraded by the employment of particular prior art additives when employed in an amount sufficient to impart fire retardant properties to the foam, in contrast to the additive of this invention which imparts fire retardancy without a corresponding loss of desirable physical properties of the foam.

Also, it is desirable that the phosphorus content be as high as possible for a given relative weight of the phosphorus compound.

Also, a foam such as polyurethane foam having an improved heat stability is desirable.

Also, a fire-retardant additive or reactant, particularly for use in the production of a polyurethane foam, desirably has a high solubility in organic solvents such as polyether polyols.

An object of this invention is a novel cyclic phosphoroamidate.

Another object is a novel process for producing the novel phosphoroamidate.

Another object is a novel polymeric composition.

Another object is a foam having high thermal stability.

Another object is a phosphoroamidate having a high solubility in water or organic solvents.

Other objects become apparent from the above and following disclosure.

The invention includes (1) novel phosphorus compounds, (2) the novel flame-retardant polymers derived from reaction of the novel phosphorus compounds with isocyanate compounds reactive with compounds containing active hydrogen as defined by the Zerewitinoff determination, and (3) the process of their preparation.

The novel phosphorus compounds are crystalline cyclic phosphoroamidates of the formula:

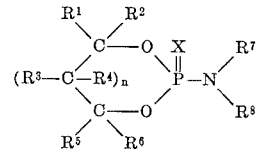

in which $n$ is zero or one, in which X is either O or S, in which $R^7$ and $R^8$ are each a first member selected from the group consisting of hydrogen, hydroxyhaloalkyl, haloalkyl, hydroxyalkyl, alkoxyalkyl, aryloxyalkyl, alkyl, alkyl-substituted alkyl, aryl, alkylaryl, haloaryl, and alkoxyaryl, provided that at least one of $R^7$ and $R^8$ is selected from the group consisting of hydroxyalkyl and hydroxyhaloalkyl, and in which $R^1$ through $R^6$ are each a member selected from the group consisting of alkoxy and said first member. For the halogen substituents, fluorine, chlorine, bromine, and iodine may be employed. In a preferred embodiment of this invention, $R^1$ and $R^5$ are each hydrogen whereby the oxygen atom of the respective primary carbon atom forms a secondary-structure such as is derived from a secondary alcohol. In a further preferred embodiment, all of $R^1$, $R^2$, $R^5$ and $R^6$ are each hydrogen, characteristic of the structure derived from a primary diol.

Typical alkyls, hydroxyalkyls, and alkoxy compounds derived therefrom, for $R^1$ through $R^8$, typically include methyl, hydroxyethyl, pentyl hydroxymethyl, decyl, and the like, the preferred alkyl being methyl.

Typical non-substituted aryl substituents include phenyl, naphthyl, and the like.

Typical substituted aryl substituents include (p-ethyl) phenyl, (o-methoxy)phenyl, and the like.

Typical haloaryls include fluorine or chlorine or bromine substituted forms such as 1,3,5-trichlorophenyl, and the like.

Typical haloalkyls include fluorine or chlorine or bromine or iodine substituted forms of the alkyl such as monochloromethyl, 1,1 - dibromoethyl, 2 - monofluoropropyl, 1,3-dichlorodecyl, and the like.

The novel cyclic phosphoroamidates of this invention are hydrolytically stable and typically function as flame retardants in polymers such as referred to above, or as flame retardant coatings for random inflammables. The novel cyclic phosphoroamidates are solid and normally have a maximum solubility of about 15 parts per 100 parts in polyether polyols at a temperature of about 25 degrees centigrade. At higher temperatures, the solubility is increased substantially.

The novel process of making the compounds of this invention comprises first reacting (a) preferably a dihydroxy compound (i.e., a diol) of preferably at least three carbon atoms having at least one hydroxy substituent on each of two separate and preferably non-adjacent carbon atoms separated by up to one carbon atom, (b) a phosphoryl trihalide ($P(X^1)X_3^2$), where $X^1$ is O or S, and $X^2$ is a halide, to form a product and subsequently reacting therewith (c) ammonia (or primary or secondary amine), to form a second product and subsequently reacting therewith (d) an aldehyde such as preferably formaldehyde, or an epoxide such as preferably ethylene oxide, in a solvent such as preferably toluene.

The diol in the solvent preferably is first heated to reflux and then cooled preferably about 45–50 degrees centigrade, followed by preferably slow addition of the phosphoryl halide, followed by reflux under preferably an inert atmosphere such as nitrogen, preferably until the evolution of hydrogen halide is substantially complete, thereby forming a cyclic phosphorohalodate, and after moderate cooling to preferably about 40–50 degrees centigrade, the ammonia (or other nitrogen compound) is added while maintaining the temperature below preferably about 50 degrees centigrade and, after addition, heating to at least 80 degrees centigrade up to not more than about 180 degrees centigrade, preferably about 90 to 110 degrees centigrade and (1) removing ammonium halide by filtration, or (2) alternatively removing ammonium halide by washing with hot water. Upon cooling, the cyclic phosphoroamidate product is crystallized and separated at preferably about room temperature.

The cyclic phosphoroamidate is thereafter reacted with an aldehyde, or with a 1,2-epoxide. Typical suitable aldehydes include formaldehyde, acetaldehyde, butyraldehyde, propenaldehyde, crotenaldehyde, chloral, benzyldehyde, and the like, of which formaldehyde is preferred because the employment of formaldehyde results in the production of primary hydroxyl groups. Suitable epoxides typically include 1,2-lower alkylene oxides, such as: ethylene oxide; 1,2-propylene oxide; 1,2-butylene oxide, and the like.

The reaction with the aldehyde or with the epoxide is normally carried out at about 0 degrees centigrade to about 60 degrees centigrade, preferably at about 20 degrees centigrade to about 30 degrees centigrade.

If each respective nitrogen atom (attached to a Z group) is merely to be mono-substituted by an aldehyde or epoxide, the remaining substituent on the nitrogen atom, if other than hydrogen, may be substituted onto the nitrogen atom at any convenient time, such as before producing the cyclic phosphoroamidate or before substituting the cyclic phosphoroamidate with an aldehyde or an epoxide, the preferred process for substituting onto the nitrogen atom depending upon the particular substituent to be substituted.

In the above-described process of this invention, although a polyol having more than two hydroxy groups may be employed, such as 1,3,5-pentanetriol, the preferred process employs a diol whereby the cyclic phosphoroamidate composition is substantially uniformly cyclic in structure.

In another embodiment, a polyol such as the 1,3,5-pentanetriol may be employed whereby a novel structure results which is either solely cyclic or includes both the cyclic phosphoroamidate structure as well as linear substituted phosphoroamidate. When a polyol is employed having more than two hydroxy groups, at least about an additional stoichiometric amount of phosphoryl halide must be employed for reaction with each additional hydroxy group if each additional hydroxy group is to react to form a linear phosphoroamidate.

For either of the two embodiments described above, a preferred embodiment of the process reacts at about 0 degrees centigrade to about 180 degrees centigrade, preferably about 30 degrees centigrade to about 50 degrees centigrade, the polyisocyanate with the polyol in which the cyclic phosphoroamidate structure either is already previously dissolved or is simultaneously dissolved at the time of reaction with the polyisocyanate. By this procedure, the phosphoroamidate of this invention becomes a structural part of the polyurethane foam.

However, another novel polyurethane foam of this invention (1) having a part of phosphoroamidate substantially physically dispersed throughout the polyurethane foam but not chemically combined with the foam, and (2) having the remainder of the phosphoroamidate molecules chemically a structural part of the polyurethane foam molecules, may be produced by reacting the polyol with either a solution and/or a mixture containing both the phosphoroamidate and the polyisocyanate; a solvent (such as monochlorobenzene) could be employed if desired.

A compound suitable for typical uses as a coating, an elastomer, an additive to an elastomer, and the like, having fire-resistant properties may be produced by either of two typical routes. The N-(aldehyde-substituted) cyclophosphoroamidate of this invention may be merely heated at from about 25 degrees centigrade to about 100 degrees centigrade, preferably at about 90 degrees centigrade to about 100 degrees centigrade, to produce compounds typically represented by the following Formula II. Alternatively, compounds typically represented by Formulas I and III may be produced by reacting the N-(aldehyde-substituted) or the N-(epoxide-substituted)-cyclic phosphoroamidate at about 0 degrees centigrade to about 180 degrees centigrade, preferably at about 40 degrees centigrade to about 50 degrees centigrade with either of an isocyanate or a polyisocyanate (such as preferably diisocyanate), preferably in the presence of typically a conventional polyurethane-type catalyst. The particular composition of the reaction product will depend upon the reactant employed, the stoichiometry, the specific reaction conditions and duration of reaction, and the like.

(I) Formula I:

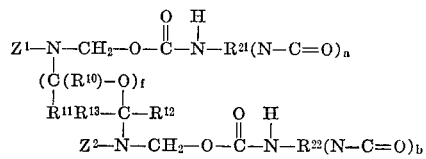

(2) Formula II:

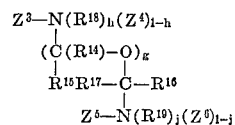

and (3) Formula III:

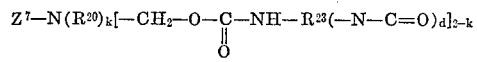

where $Z^1$, $Z^2$, $Z^3$, $Z^4$, $Z^5$, $Z^6$, and $Z^7$ are each a member of Formula IV:

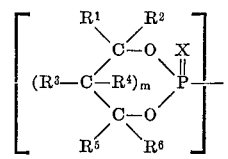

in which X is either oxygen or sulfur, in which each of $R^1$ through $R^6$ are defined above, in which $R^{10}$ through $R^{17}$ are each selected from the members of $R^1$ through $R^6$, in which $R^{18}$, $R^{19}$ and $R^{21}$ through $R^{23}$ are each selected from the members of $R^7$ and $R^8$ as defined above, in which $R^{20}$ is selected from the group consisting of the members of $Z^3$ and the members of $R^7$ and $R^8$ defined above, in which each of $f$, $g$, $h$, $j$, $k$, and $m$ is zero to one, in which $a$, $b$ and $d$ each ranges from zero up to about six or more when $R^{21}$, $R^{22}$ and $R^{23}$ each respectively is alkyl (depending upon the length of the alkyl chain) and up to about three when $R^{21}$, $R^{22}$ and $R^{23}$ each respectively is an aryl such as phenyl or naphthyl.

The compounds of Formula II are produced by first heating the formaldehyde-substituted cyclic phosphoroamidates of this invention.

The compounds of the general type of Formula III are produced by reacting an isocyanate (or polyisocyanate) with the formaldehyde-substituted or epoxide-substituted cyclic phosphoroamidate of this invention.

Where $a$ or $b$ or $d$ is zero, the compound is derived from a monoisocyanate, whereas where $a$ or $b$ or $d$ is one or more, the compound is derived from a polyisocyanate such as diisocyanate. Where $a$ or $b$ or $d$ is at least one, the compound may be further reacted with either a monohydroxy compound or with a polyol, to produce an addition compound, of similar utility. Similarly, where $a$ or $b$ or $d$ is at least one and $k$ is zero to one, a polyol may be reacted therewith to produce a fire resistant foam, or a monohydroxy compound may be reacted therewith to produce an addition compound having similar utility, including the fire retardant properties. Infrared data provides substantially conclusive evidence that a compound of Formula II exists as a product of the process of preparation described above. However, it is not possible to reliably predict all possible structures which are produced in either major or minor amounts by either of the (1) heating or (2) reaction processes, described above, and it is therefore necessary to describe the product by the process, except for the specific singular compound of the Formula II described above.

When a polyol is included in the reaction with the phosphoroamidate and the isocyanate or polyisocyanate to produce a polyurethane foam, the foam product also includes a polyurea as a part of the foam as a result of the isocyanate or polyisocyanate derived from a breakdown of the hydroxyalkyl group(s) of the cyclic phosphoroamidate. Thus, the foam is in fact a polyurea-polyurethane foam which has physically dispersed throughout the foam the polymeric structure such as possibly that represented by Formula I discussed above; however, it is possible that the residue of the cyclic phosphoroamidate may be chemically linked to the polyurea-polyurethane foam structure.

It is preferably to the process of this invention that the polyurethane-type catalyst be present, when the cyclic phosphoroamidate is either difunctional or monofunctional.

Typical polyurethane-type catalyst include: triethyl amine, tetramethylguanidine, N-ethyl morpholine, N-methyl morpholine, diethanol amine, triethylene diamine, dimethylethanol amine, stannous octoate, tin dibutyldilaurate, and the like. The catalyst is normally employed in the range of about 0.01 to about 5% by weight based on the total weight of reactants and in a preferred amount of about 1 to about 2%.

Typical compounds of this invention include, for example:

2,2-dimethyl-1,3-propylene-N,N-dihydroxymethyl phosphoroamidate;
2,2,4-trimethyl-1,3-pentylene-N-hydroxyethyl phosphoroamidate;
1-methyl-3-isopropyl-1,3-propylene-N,N-dipropoxydecyl phosphoroamide;
1-butyl, 3-phenyl-2,2-dimethyl-1,3-propylene-N,N-diphenoxymethyl phosphoroamidate;
2,2,4-trimethyl-1,3-pentylene-N,N-dihydroxymethyl phosphoroamidate;
2,2-dimethyl-4-hexyl-1,3-pentylene-N,N-dihydroxymethyl phosphoroamidate;
2,2-diethyl-4-butyl-1,3-pentylene-N,N-dihydroxymethyl phosphoroamidate;
2,2-dimethyl-1,3-propylene-N,N-dihydroxyethyl thiophosphoroamidate;
1-butyl, 3-phenyl-2,2-dimethyl-1,3-propylene-N,N-dihydroxymethyl thiophosphoroamidate;
2,2-4-trimethyl-1,3-pentylene-N,N-dihydroxynonyl thiophosphoroamidate;
2,2-dimethyl-4-hexyl-1,3-pentylene-N-hydroxymethyl thiophosphoroamidate;
2,2-diethyl-4, butyl-1,3-pentylene-N,N-dihydroxybutyl thiophosphoroamidate;
1-methyl-3-isopropyl-1,2-propylene-N,N-dihydroxymethyl phosphoroamidate;
2,2-diethyl-4-butyl-1,3-pentylene-N,N-dihydroxymethyl phosphoroamidate, and the like.

Typical polyisocyanates for use in the process of this invention include, for example, aromatic compounds such as diisocyanates such as 2,4-toluene diisocyanate, polynuclear isocyanates of various types and brands, and the like, and aliphatic compounds such as hexamethylene diisocyanate, DD1 diisocyanate (exact chemical nomenclature unknown), and the like.

Typical monoisocyanates include toluene isocyanate, hexyl isocyanate and the like.

Typical nitrogen compounds that produce the phosphoroamidate necessary for the process of this invention include, for example, the preferred ammonia or any primary or secondary amine; the difunctional primary amine is not as desirable because it produces a monofunctional phosphoroamidate which may block the cross-linking and polymerization reactions ordinarily possible when employing a difunctional phosphoroamidate derived from ammonia in the process of producing the phosphoroamidate-cross-linked or polymerized polyurethane foam of this invention, to the extent that the amount of the primary amine employed at least equals the isocyanate available for reaction therewith. Similarly, a secondary amine would produce a phosphoroamidate which would not possess any reactivity in the process for the production of the polyurethane foam.

The primary amine can be used to produce the novel polyurethane foam in which the mono-reactive amine produces a product containing phosphoroamidates predominately on chain endings. Similarly, the secondary amines may be employed to produce a polyurethane foam physically impregnated with the non-reactive cyclic phosphoroamidate added by any of the above-described process procedures.

In the reaction of the polyol, the phosphoryl trihalide, and the ammonia or amine, typical solvents that may be employed include, for example, toluene, benzene, chlorobenzenes, and the like. Toluene is preferred because it refluxes at a preferred reaction temperature.

For the reaction of the polyol, the phosphoryl trihalide, and the ammonia or the amine, the broad temperature range is from about 0 degrees centigrade to about 180 degrees centigrade, and the preferred range is from about 60 degrees centigrade to about 120 degrees centigrade. The subsequent cooling is to a temperature ranging from about 0 degrees centigrade to about 50 degrees centigrade.

The halide of the phosphoryl halide or thiophosphoryl halide is selected from the group consisting of chlorine, bromine, or iodine, preferably chlorine.

It should be noted that (trivalent) phosphorus trihalide may be initially employed, but must be oxidized with oxygen or sulfur at some advantageous point in the process to produce the thermally stable pentavalent oxygen or sulfur compound.

It also should be noted that when the cyclic phosphoroamidate of this invention is reacted with the polyisocyanate in the presence of hydroxyl-containing polymers, both polyurethane and polyureas are produced.

The polymeric-foam composition of this invention is structurally a cross-linked composition of the precursor reactants comprising the cyclic phosphoroamidate and/or a polyol, and a polyisocyanate. By current known methods of analysis, it is not possible to determine the exact structure of the foam.

The novel cyclic phosphoroamidates of this invention also have a utility as flame retardant in various materials such as coatings, paints, elastomers, and other types of polymers.

A preferred utility is used to produce a novel fire-retardant polyurethane foam produced by a process of reacting the novel cyclic phosphoroamidate with a polyisocyanate such as diisocyanate. An advantage of this novel polyurethane foam over some of other known types of polyurethane foams is that the novel foam possesses a high degree of flame retardance. This is demonstrated by the fact that smaller molar amounts of the novel phosphoroamidate of this invention are required to achieve a given level of flame retardance when compared to some of several commercial types that are presently on the market. This desirable quality at least partially stems from the fact that the above-named phosphoroamidate contains a large amount of phosphorus. The significance of the high degree of fire-retardancy of the novel phosphoroamidate, as compared to identical molar amounts of known fire-retardants, is that it is normally preferred to employ as low a molar amount of fire retardant as is possible to obtain a particular degree of fire retardancy, because as the required molar amounts increase, the chances of detrimental effects on the polymer normally increase in direct proportion. Also, the cost often increases as larger molar amounts are required.

Advantages of the N-substituted cyclic phosphoroamidate of this invention over the non-N-substituted cyclic phosphoroamidate for the production of the polyurea-polyurethane foam include: (1) a reduced density of the foam resulting fro mcarbon dioxide evolved as a by-product of water with the isocyanate or polyisocyanate in the formation of the polyurea; and (2) the fact that the N-substituted cyclic phosphoroamidate of this invention does not have any maximum for solubility in polyether polyols as contrasted to the non-substituted cyclic phosphoroamidate which has maximum solubility of about fifteen parts in one hundred parts of a polyether polyol, and the like.

A polyurea-polyether foam of this invention of reduced density often has improved thermal stability (heat distortion), as contrasted to either a conventional polyurethane foam or to the polyurethane foam which includes a non-aldehyde-substituted cyclic phosphoroamidate.

The following examples are given solely to illustrate typical embodiments of the invention described above, and are not intended to limit the invention except to the extent specifically stated in the specification and to the extent to which the appended claims are limited. All parts are by weight, and temperature is expressed in degrees centigrade, unless otherwise stated.

An advantage of using the above-listed phosphoroamidates becomes evident when the following example is considered.

EXAMPLE I

The polyurethane foams of this example are made using a general purpose polyether polyol, i.e. oxypropylated pentaerythritol and polynuclear polyisocyanate (derived from aniline, formaldehyde and phosgene).

For a control (Foam B) and a composition embodiment of this invention (Foam A), the foam is produced in each example by first preferably making two separate mixtures (blends) and thereafter admixing (blending) the separate mixtures, as follows. A first blend is prepared by admixing the polyol, a cell-controller catalyst (preferred), and (for the Foam A) the cyclic phosphoroamidate of this invention, and adjusting the temperature to 0 degrees centigrade to about 100 degrees centigrade, preferably about 40 degrees centigrade to about 50 degrees centigrade. A second blend is prepared by admixing the polynuclear isocyanate and a blowing agent such as a Freon blowing agent (R–11, for example). After adjusting the temperature of the first blend in the manner described above, the two blends are admixed together, preferably adding the second to the first, the blending thereof taking place for about 40 to 50 seconds, provided that the blending period is sufficiently extended to initiate a reaction whereby a prefoam (ungelled foam) is formed. The prefoam is poured into a proper mold and allowed to rise and cure at about 70 degrees centigrade to about 100 degrees centigrade. Foam A is a polyurea-polyurethane composition characterized by a high (good) rigidity to elevated temperatures as evidenced by an increased heat distortion temperature as compared to the control polyurethane Foam B. The stoichiometry of Foam A and Foam B is as follows.

Foam A: Gms.
- Polyol (oxypropylated pentaerythritol) _____ 75
- Phosphoroamidate (of this invention) _____ 25
- Cell controller _____ 0.5
- Triethyl amine catalyst _____ 1.5
- R–11 (a commercial blowing agent) _____ 35
- Polynuclear isocyanate _____ 112

Foam B: Gms.
- Polyol (oxypropylated pentaerythritol) _____ 100
- Cell controller _____ 0.5
- Triethyl amine catalyst _____ 1.5
- R–11 (a commercial blowing agent) _____ 30
- Polynuclear isocyanate _____ 87

Foam A properties:
(1) density (lbs. per ft.$^3$):2.0
(2) 5% volume expansion temperature: 127 degrees centigrade [1]

[1] The temperature at which a cu. ft. of foam 2″ x 2″ x 2″ expands 5% of its original volume.

The advantage of using the above compound of this invention is that you obtain a substantial increase in heat distortion temperature, i.e., 97 degrees centigrade to 127 degrees centigrade. This means that the use of this compound permits the use of foam of low density to be used in areas that require a high temperature stability.

Foam B properties control):
(1) density (pounds per cu. foot):2.0
(2) 5% volume expansion temperature: 97 degrees centigrade Compound: Gms.
- Polyether polyol _____ 75
- Compound of this invention _____ 25
- Freon 11 (fluorotrichloromethane) _____ 30
- Triethyl amine catalyst _____ 1.5
- PAPI (polynuclear isocyanate) _____ 89.5
- Cell controller _____ 0.5

EXAMPLE II

In this preparation, the components are employed as follows:

Gms.
- (Compound) cyclic phosphoroamidate _____ 20.7
- Toluene diisocyanate _____ 17.4
- Monochlorobenzene _____ 100.0
- Triethyl amine (catalyst) _____ 0.5

The cyclic phosphoroamidate, toluene diisocyanate, monochlorobenzene, and triethyl amine are charged into a suitable reactor equipped with a mechanical stirrer, thermometer and a nitrogen inlet tube. The reaction mixture is stirred for 1 hour at 75 degrees centigrade under a blanket of dry nitrogen, a sample taken and an infrared spectra run. A polyurea is identified as the product.

EXAMPLE III

Reagents:
438 gms. 2,2,4-trimethyl-1,3-pentane diol
460 gms. phosphoryl trichloride
1261 gms. diethanol amine
1950 cc. toluene Procedure: The pentane diol was added to the phosphoryl trichloride at such a rate and temperature, 50 degrees centigrade, so as to produce the corresponding 2,2,4-trimethyl-1,3-pentylene phosphorochlorodate (Formula V):

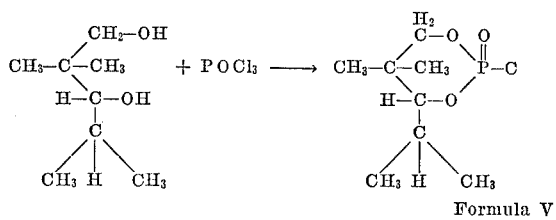

Formula V

The phosphorochlorodate was added dropwise to a solution of diethanol amine and toluene producing Formula VI:

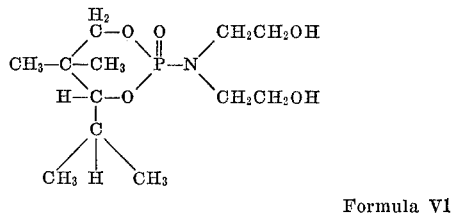

Formula VI

It is within the scope of this invention to employ substitutes and equivalents thereof to the extent that would be obvious to a skilled artisan. Accordingly, this invention is limited solely to the extent that limitations appear in the appended claims, interpreted in the light of the overall disclosure.

We claim:
1. A cyclic phosphoroamidate of the formula

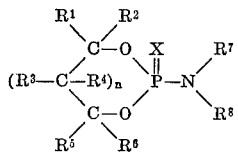

in which $n$ is zero or 1; $R^7$ and $R^8$ are each a first member and are independently selected from the group consisting of hydrogen, alkyl, hydroxy alkyl, hydroxy haloalkyl, haloalkyl, aryl, alkylaryl, haloaryl and alkoxyaryl, provided that at least one of $R^7$ and $R^8$ is independently selected from the group consisting of hydroxyalkyl and hydroxyhaloalkyl, and in which $R^1$ through $R^6$ are each a second member independently selected from the group consisting of alkoxy and said first member; wherein said alkyl- and alkoxy is from 1 to 12 carbon atoms; and aryl- is phenyl or naphthyl.

2. A composition according to claim 1 in which $R^1$ and $R^5$ are each hydrogen.

3. A composition according to claim 1 in which $R^1$, $R^2$, $R^5$ and $R^6$ are each hydrogen.

4. The compound of claim 1 wherein $R^7$ is hydroxy lower alkyl.

5. The compound of claim 1 wherein $R^7$ is —$CH_2OH$.

6. The compound of claim 1 wherein $R^7$ is —$C_2H_4OH$.

7. The compound of claim 1 wherein $n$ is 1.

8. The compound of claim 1 wherein $R^3$ and $R^4$ are lower alkyl.

9. The compound of claim 1 wherein $R^5$ is lower alkyl.

10. The compound

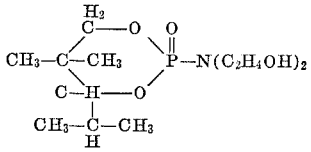

11. A process for preparing a cyclic phosphoroamidate comprising, reacting a cyclic phosphoroamidate of the following formula:

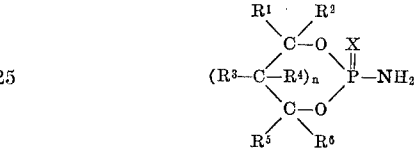

wherein $R^1$ through $R^6$ are each independently selected from the group consisting of hydrogen, alkyl, hydroxy haloalkyl, haloalkyl, aryl, alkylaryl, haloaryl, alkoxyaryl and alkoxy; wherein alkyl- and alkoxy is from 1 to 12 carbon atoms; and aryl- is phenyl or naphthyl; at a temperature of from about 0° C. to about 60° C. with a lower alkyl aldehyde or a 1,2 lower alkylene oxide.

12. The process of claim 11 wherein the aldehyde is formaldehyde.

13. The process of claim 11 wherein ethylene oxide is the lower alkylene oxide.

References Cited

UNITED STATES PATENTS 2,661,365  12/1953  Gamrath et al. _____ 260—937
3,205,120  9/1965   Flanders.

FOREIGN PATENTS 759,396  10/1956  Great Britain _____ 260—937

OTHER REFERENCES

Kosolapoff, "Organophosphorus Compounds," J. Wiley & Sons, Inc., New York, p. 231 (1950).

Wagner et al., "Synthetic Organic Chemistry," J. Wiley & Sons, Inc., New York, p. 672 (1953).

Cram et al., "Organic Chemistry," McGraw-Hill, New York, 1964, p. 298.

CHARLES B. PARKER, Primary Examiner

A. H. SUTTO, Assistant Examiner

U.S. Cl. X.R.

260—2.5, 471, 927, 968, 974